(12) United States Patent
Hwang

(10) Patent No.: US 8,199,216 B2
(45) Date of Patent: Jun. 12, 2012

(54) APPARATUS AND METHOD FOR IMPROVING IMAGE QUALITY OF IMAGE SENSOR

(75) Inventor: Sung-Hyun Hwang, Chungcheongbuk (KR)

(73) Assignee: Intellectual Ventures II LLC, Wilmington, DE (US)

( * ) Notice: Subject to any disclaimer, the term of this patent is extended or adjusted under 35 U.S.C. 154(b) by 380 days.

(21) Appl. No.: 12/495,129

(22) Filed: Jun. 30, 2009

(65) Prior Publication Data

US 2009/0262223 A1 Oct. 22, 2009

Related U.S. Application Data

(63) Continuation of application No. 11/288,729, filed on Nov. 28, 2005, now Pat. No. 7,576,891.

(30) Foreign Application Priority Data

Nov. 1, 2005 (KR) ............................. 2005-0103737

(51) Int. Cl.
*H04N 9/73* (2006.01)
(52) U.S. Cl. ..................................... 348/223.1; 348/241
(58) Field of Classification Search ............... 348/223.1, 348/224.1, 241
See application file for complete search history.

(56) References Cited

U.S. PATENT DOCUMENTS

| 2002/0041331 A1* | 4/2002 | Xiaomang et al. ............ 348/234 |
| 2003/0113013 A1 | 6/2003 | Hammadou |
| 2004/0085475 A1* | 5/2004 | Skow et al. .................... 348/362 |
| 2004/0183919 A1 | 9/2004 | Yamamoto |
| 2004/0212692 A1* | 10/2004 | Nakami et al. ............. 348/224.1 |
| 2004/0252218 A1 | 12/2004 | Kovvuri et al. |
| 2005/0117036 A1 | 6/2005 | Nishi et al. |
| 2005/0275736 A1 | 12/2005 | Chiu et al. |
| 2007/0005795 A1* | 1/2007 | Gonzalez ...................... 709/232 |

FOREIGN PATENT DOCUMENTS

| JP | 2000-287219 | 10/2000 |
| JP | 2002-209224 | 7/2002 |
| JP | 2004-229232 | 8/2004 |
| JP | 2005-110176 | 4/2005 |

OTHER PUBLICATIONS

Edward M. Schwalb, ITV handbook: Technologies and Standards, 2003, Prentice Hall PTR, pp. 530-531.
Japanese Office Action dated Jul. 21, 2010. (English translation provided).

* cited by examiner

*Primary Examiner* — Gevell Selby
(74) *Attorney, Agent, or Firm* — McAndrews, Held & Malloy Ltd.

(57) ABSTRACT

Provided are an apparatus and method for improving an image quality of an image sensor, capable of adaptively removing noise occurring in a de-mosaicking that is performed for generating three-channel data of R, G and B from a single channel pixel structure based on a bayer pattern. The apparatus includes a first converting unit for converting RGB color data into a YCbCr color data, the RGB color data being obtained from bayer data through a de-mosaicking, a noise removal unit for removing noise from a Cb and a Cr color data outputted from the first converting unit, and a second converting unit for converting the Cb and the Cr color data from the noise removal unit and a Y data from the first converting unit into the RGB color data.

25 Claims, 7 Drawing Sheets

APPARATUS AND METHOD FOR IMPROVING IMAGE QUALITY OF IMAGE SENSOR

CROSS REFERENCE TO RELATED APPLICATIONS

This application is a continuation of U.S. patent application Ser. No. 11/288,729, filed on Nov. 28, 2005, entitled "APPARATUS AND METHOD FOR IMPROVING IMAGE QUALITY OF IMAGE SENSOR", the entirety of which is incorporated herein by reference.

FIELD OF THE INVENTION

The present invention relates to a semiconductor technology; and, more particularly, to an apparatus and method for improving an image quality of an image sensor, such as a CMOS image sensor or a CCD, by removing a color noise.

DESCRIPTION OF THE RELATED ART

With the advance of Internet-based video communications, demands of digital cameras are explosively increasing. In addition, as mobile terminals with built-in camera, such as personal digital assistants (PDAs), international mobile telecommunications-2000 (IMT-2000) terminals, and code division multiple access (CDMA) terminals, are widely spread, demands of small-sized camera modules are increasing.

The camera module includes an image sensor as a basic element. The image sensor is a device to convert an optical image into an electric signal. As the image sensor, a complementary metal oxide semiconductor (CMOS) sensor and a charge coupled device (CCD) are widely used.

The CCD image sensor has a lot of disadvantages, such as a complex driving scheme, a high power consumption, a complex manufacturing process because of a large number of mask processes, a difficulty in implementing one chip because a signal processing circuit cannot be integrated inside a chip, and so on. On the contrary, the CMOS image sensor can achieve a monolithic integration of control/driving/signal processing circuits on a single chip. For these reasons, the CMOS image sensor draws great attraction. Further, compared with the CCD image sensor, the CMOS image sensor can be potentially manufactured at a low cost due to a low voltage operation, a low power consumption, a compatibility with peripheral devices, and utilization of standard CMOS fabrication process.

However, in the CMOS image sensor, analog signals generated from a light-receiving element, e.g., a photodiode, have various parasitic effects caused by a parasitic capacitance, a resistance, a dark current leakage, or a mismatched characteristic of semiconductor devices. These parasitic effects inevitably occur in the semiconductor device and degrade a signal to noise ratio of an image data. Accordingly, noise is an important factor to restrict performance of the CMOS image sensor.

A cause of noise occurring in the CMOS image sensor is a kT/C noise related to a sampling of image data, 1/f noise related to a circuit used for amplifying image signal, a fixed pattern noise (FPN) related to a mismatch with a signal process circuit of the image sensor, and so on. The FPN is very bad visually because it appears in form of a vertical line or strip and thus it can be easily recognized by humans' eyes.

The CMOS image sensor includes an image sensor processor (ISP) for processing an image. The IPS has been designed in various methods so as to enhance an image quality of the image sensor. One method is a de-mosaicking.

FIG. 1 is a diagram showing a bayer pattern.

As shown, each of pixels stores information on a single color alone. Therefore, in order to obtain information on the other two colors, all image sensors adopting the bayer pattern generate estimated values with respect to colors of the image using information on adjacent different colors. At this point, a de-mosaicking is demanded.

The de-mosaicking is one of data interpolation methods. The simplest de-mosaicking is a zero-th order interpolation that uses color information of adjacent pixels without any modification. In addition, a linear interpolation uses all information on adjacent different colors, and an adaptive interpolation adaptively calculates values by assigning weight to adjacent pixels. However, due to the fundamental limitation of the bayer pattern, the de-mosaicking causes color noise.

FIG. 2A is a diagram depicting an original color image and FIG. 2B is a diagram depicting a resultant image given when a de-mosaicking, specifically a linear interpolation, is applied to the original color image of FIG. 2A.

As can be seen from FIG. 2B, color noise that does not exist in the original color image of FIG. 2A appears at boundaries of objects in the image.

SUMMARY OF THE INVENTION

It is, therefore, an object of the present invention to provide an apparatus and method for improving an image quality of an image sensor, capable of adaptively removing color noise occurring in a de-mosaicking that is performed for generating three-channel data of R, G and B from a single channel pixel structure based on a bayer pattern.

In accordance with an aspect of the present invention, there is provided an apparatus for improving an image quality of an image sensor including: a first converting unit for converting a RGB color data obtained from bayer data through a de-mosaicking into a YCbCr color data; a noise removal unit for removing a noise of a Cb and a Cr color data outputted from the first converting unit based on a reference determined by the Cb and the Cr color data; and a second converting unit for converting Cb and Cr color data outputted from the noise removal unit and a Y color data from the first converting unit into the RGB color data.

In accordance with another aspect of the present invention, there is provided a method for improving an image quality of an image sensor, the method including the steps of: converting a RGB color data into a YCbCr color data, the RGB color data being obtained from bayer pattern through a de-mosaicking; removing a noise from a Cb and a Cr color data among the data converted into the YCbCr color data; and converting the Cb and the Cr color data outputted from the noise removal unit and Y data into the RGB color data.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

An apparatus and method for improving an image quality of an image sensor in accordance with exemplary embodiments of the present invention will be described in detail with reference to the accompanying drawings.

Figure 1:
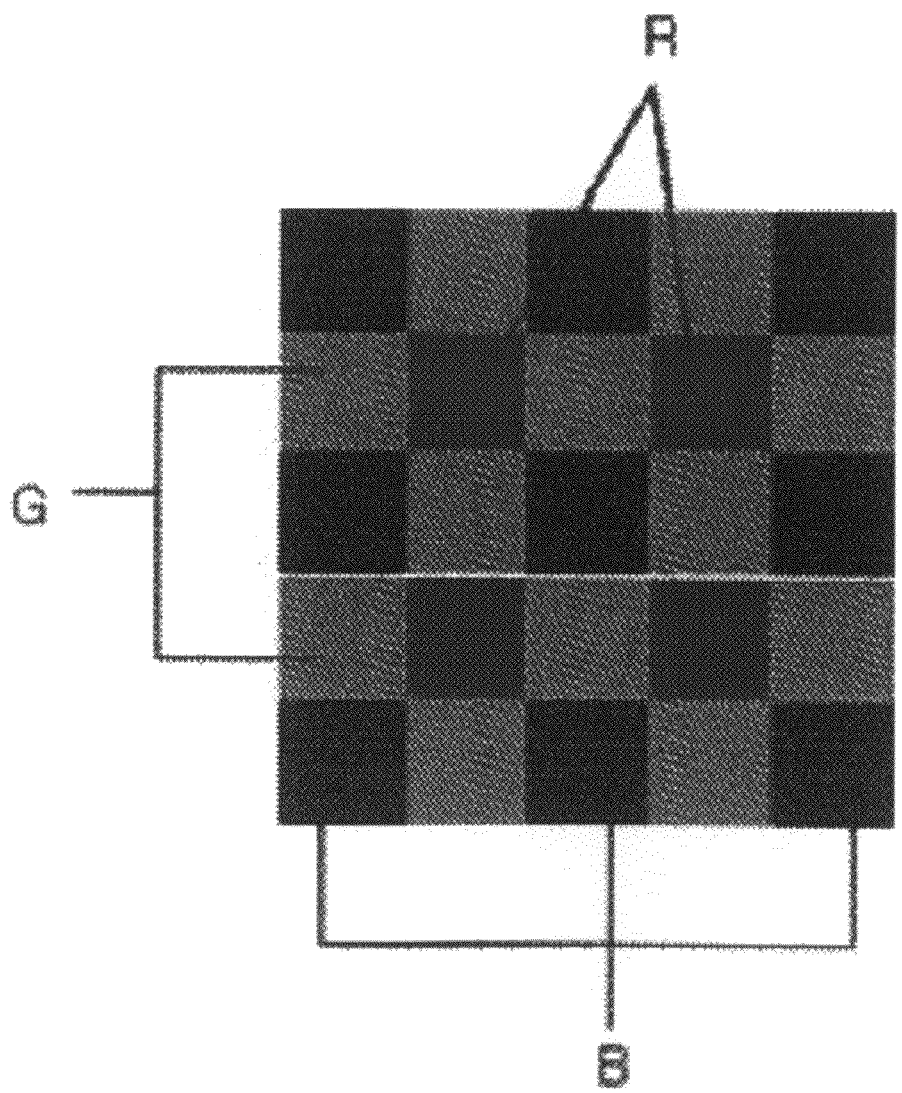
FIG. 1 is a diagram showing a conventional bayer patter.
Figure 2A:
FIG. 2A is a diagram depicting an original color image.
Figure 2B:
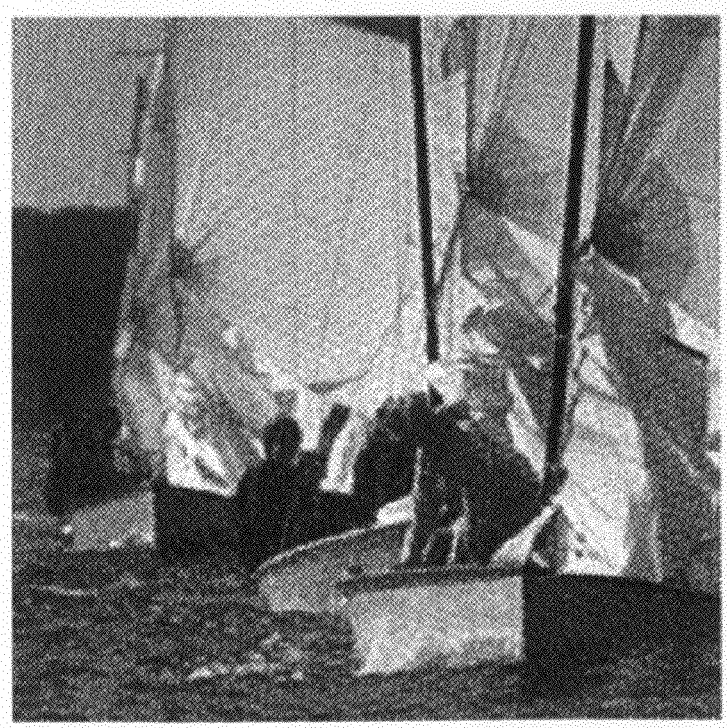
FIG. 2B is a diagram depicting a resultant image given when a de-mosaicking is applied to the original color image of FIG. 2A.
Figure 3:
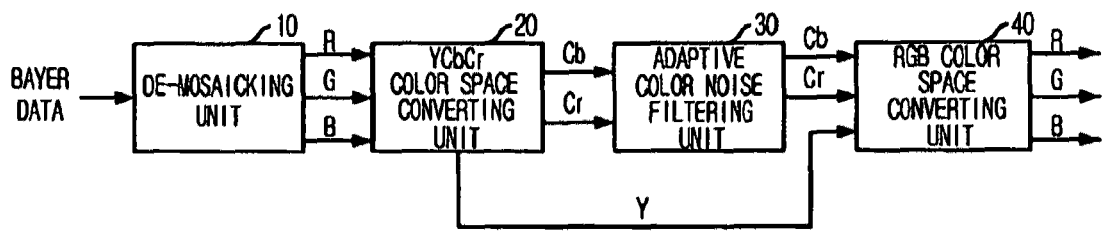
FIG. 3 is a block diagram showing an apparatus for improving an image quality of an image sensor in accordance with an embodiment of the present invention.

FIG. 3 is a block diagram showing an apparatus for improving an image quality of an image sensor in accordance with an embodiment of the present invention.

As shown, the apparatus in accordance with the embodiment of the present invention includes a de-mosaicking unit 10, an YCbCr color space converting unit 20, an adaptive color noise filtering unit 30, and an RGB color space converting unit 40.

The de-mosaicking unit 10 obtains RGB color images from a bayer through a de-mosaicking. The YCbCr color space converting unit 20 converts the RGB color images into YCbCr color space. The adaptive color noise filtering unit 30 independently performs a smoothing process according to Cb data and Cr data outputted from the YCbCr color space converting unit 20 to remove a color noise. The RGB color space converting unit 40 converts the Cb data and the Cr data from the adaptive color noise filtering unit 30 and Y data from the YCbCr color space converting unit 20 into a RGB color space.

The YCbCr color space converting unit 20 converts the RGB color images into the YCbCr color space using a matrix-vector product given by $$\begin{bmatrix} Y \\ Cb \\ Cr \end{bmatrix} = \begin{bmatrix} 0.299 & 0.587 & 0.114 \\ -0.169 & -0.331 & 0.5 \\ 0.5 & -0.419 & -0.081 \end{bmatrix} \begin{bmatrix} R \\ G \\ B \end{bmatrix} + \begin{bmatrix} 0 \\ 128 \\ 128 \end{bmatrix} \quad (1)$$

Since the Cb data and the Cr data obtained by Eq. (1) contain most of color information, they are adapted for removing color noise that may be caused during the de-mosaicking.

The adaptive color noise filtering unit 30 uses an adaptive smoothing to independently perform a smoothing with respect to the Cb data and the Cr data outputted from the YCbCr color space converting unit 20. The adaptive smoothing means that the smoothing is differently applied depending on areas. For example, in case where edges or boundaries exist in kernels in which the Cb data and Cr data are stored, if an average value is extracted by simply averaging components contained in all kernels, boundaries are blurred.

Accordingly, a threshold value to be used during a filtering process is determined using an input value of a middle position from input data. Then, the smoothing is performed using the determined threshold value. This method is called the adaptive smoothing.

The adaptive smoothing will be described below with reference to FIG. 6. It will be assumed that a kernel size is 9 and data are sequentially inputted within the kernel.

Figure 6:
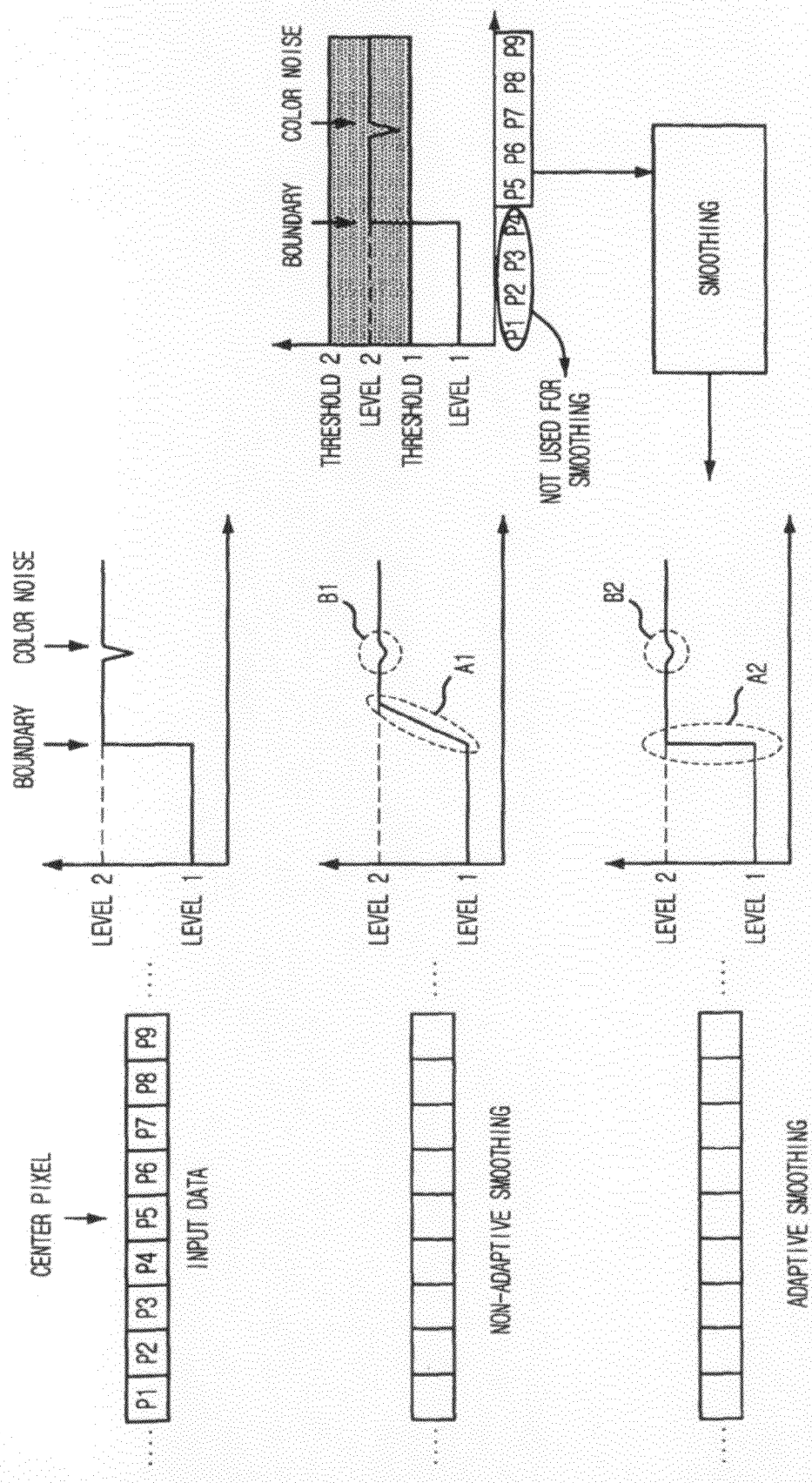
FIG. 6 is a diagram for explaining an operational characteristic of an YCbCr color space converter illustrated in FIG. 3.

Referring to FIG. 6, a pixel P5 represent a pixel disposed at the center from the input data and an adaptive smoothing is performed on pixels adjacent to the center pixel P5. If a non-adaptive smoothing is performed without setting the center pixel, some of color noise can be removed as indicated by 'B1', but a boundary region is blurred as indicated by 'A1'. Therefore, a device characteristic is badly affected. That is, color blurring phenomenon occurs in the color boundary region as indicated by 'A1'.

In order to prevent the color blurring phenomenon occurring at the boundary region when applying the non-adaptive smoothing, only adjacent pixels disposed within a predetermined range which is determined by a threshold value centering on the center pixel P5 are smoothed. Therefore, a blurring phenomenon of brightness level is removed as indicated by 'A2', and noise is removed as indicated by 'B2'. The predetermined range is determined by threshold values Threshold1 and Threshold2. Consequently, the adaptive smoothing is performed on the boundary regions by smoothing only similar values to the value of the center pixel among the input pixels.

As described above, the adaptive color noise filtering unit 30 uses a one-dimensional filter to independently perform the adaptive smoothing on the Cb data and the Cr data. The one-dimensional filter can exclude the use of a memory in hardware implementation. Meanwhile, the adaptive color noise filtering noise 30 is not limited to the one-dimensional filter, but can also use a two-dimensional filter when a spatial resource is sufficient.

Figure 4:
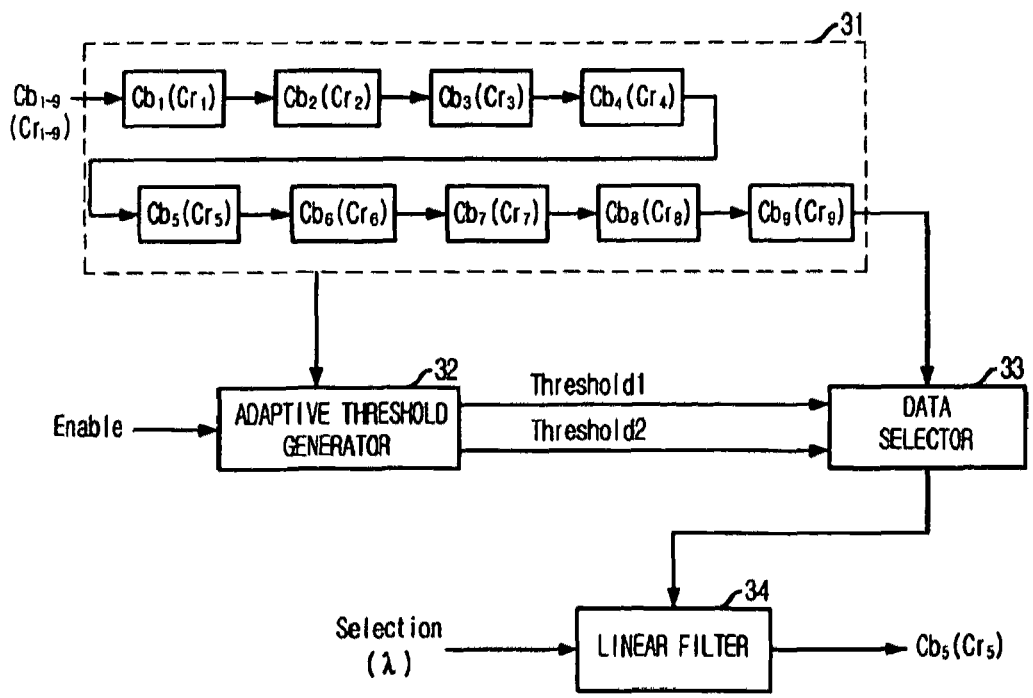
FIG. 4 is a block diagram showing an adaptive color noise filter illustrated in FIG. 3.

Hereinafter, a structure of the one-dimensional filter will be described with reference to FIG. 4 as one example for convenience.

As shown, the one-dimensional filter includes a register 31, an adaptive threshold generator 32, a data selector 33, and a linear filter 34.

The register 31 sequentially stores the Cb data and Cr data outputted from the YCbCr color space converting unit 20. The adaptive threshold generator 32 determines a threshold value used during the filtering process by using a data disposed at the center of the data stored in the register 31. The data selector 33 selects the output data of the register 31 by using the threshold values Threshold1 and Threshold 2 outputted from the adaptive threshold generator 32. The linear filter 34 smoothes the selected data according to a select signal Selection.

The register 31 sequentially receives the Cb data or the Cr data and stores them in a pipeline form. That is, since each value of the pixels obtained from the image sensor is transmitted in real time in a pipeline form, (N+1) number of data has to be stored in the respective registers during the smoothing by using N number of pixels adjacent to the center pixel. For example, nine data are stored in the respective registers during the smoothing by using eight pixels centering on the center pixel. In addition, the number of the adjacent pixels can be expended or reduced.

The adaptive threshold generator 32 operates in response to an enable signal Enable and determines the threshold value used during the filtering process by using the input value of the data disposed at the center among the (N+1) number, e.g., nine, of data stored in the register 31. Under the assumption that a statistical characteristic of noise added to the adjacent pixels follows a Gaussian distribution, a minimum threshold value is equal to 'P5−3×σ' and a maximum threshold value is equal to 'P5+3×σ' with respect to a standard deviation (σ) obtained by calculating deviations of the pixels. These equations are derived from the characteristic that 99% of the probability that there can be noise in the Gaussian distribution exists within ±3σ from the average value. The final threshold value can be calculated as Eq. (2) below by referring to phase structure of the nine stored pixel values and considering the case that magnitude distribution of pixels has a step function.

$$Th = \min\left\{3\sigma, \frac{1}{2}(\min\{Cb(n)\} + \max\{Cb(n)\})\right\} \quad (2)$$

$$Th1 = P5 - Th$$

$$Th2 = P5 + Th$$

The data selector 33 selects the data sequentially inputted from the register 31 by using the threshold values Threshold1 and Threshold2 determined by the adaptive threshold generator 32.

In Eq. (2), the elements P1 to P9 represent the pixels stored in the register 31, min{ } calculates the minimum value within the set, and max{ } calculates the maximum value within the set. In order not to affect the different brightness levels, a minimum value among 3σ, half of the average of the minimum value and the maximum value is determined as the minimum value. The threshold values Threshold1 and Threshold2 are calculated from Eq. (2).

As illustrated in FIG. 6, the data sequentially inputted from the register 31 are compared centering on the threshold values Threshold1 and Threshold2, and a second order input value to be used during the smoothing is selected. A Gaussian weight can be assigned to the selected data, centering on the center pixel. Also, the smoothing can be performed through a simple unit weight. The other data are not used as the second order input value. For example, in FIG. 6, the selected data are P5 to P9, and the unselected data are P1 to P4.

The linear filter 34 performs the smoothing on the data selected by the data selector 33. An example of the linear filter is illustrated in FIG. 5.

Figure 5:
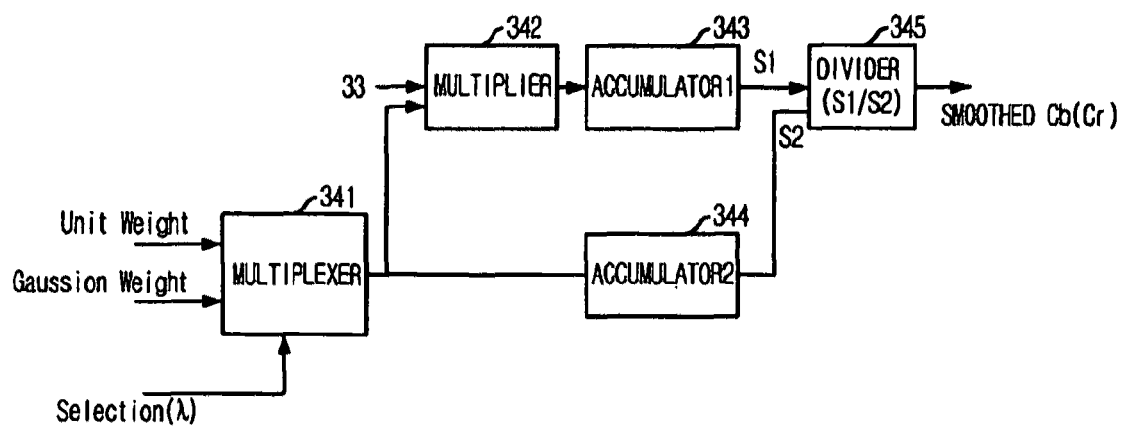
FIG. 5 is a block diagram showing a linear filtering unit illustrated in FIG. 4.

Referring to FIG. 5, the linear filter 34 includes a multiplexer 341 for selecting a smoothing weight in response to the select signal Selection, a multiplier 342 for multiplying the selected weight by the data selected by the data selector 33, a first accumulator 343 for sequentially summing the data outputted from the multiplier 342, a second accumulator 344 for sequentially summing the weights selected by the multiplexer 341, and a divider 345 for dividing the output data S1 of the first accumulator 343 by the output data S2 of the second accumulator 344 for normalization.

The multiplexer 341 selects the Gaussian weight or a unit weight in response to the select signal Selection. Here, the unit weight is a weight for an arithmetic average. For example, when the select signal Selection (λ) is '0', the unit weight is selected. When the select signal Selection (λ) is '1', the Gaussian weight is selected. The select signal Selection (λ) is determined by the user.

The multiplier 342 multiplies the selected weight from the multiplexer 341 by the sequentially inputted data from the data selector 33. For example, when the unit weight is selected by the multiplexer 341, the respective data sequentially inputted from the data selector 33 are multiplied by '1'. When the Gaussian weight is selected, the respective data are multiplied by the Gaussian weight.

The first accumulator 343 sequentially sums the values outputted from the multiplier 342.

The second accumulator 344 sequentially sums the weights outputted from the multiplexer 341.

The divider 345 divides the output data S1 of the first accumulator 343 by the output data S2 of the second accumulator 344 for normalization, and outputs normalized data, for example, the Cb data or the Cr data.

A relationship between the final user input and the smoothing is expressed as $$P'_S = (1-\lambda)\frac{1}{C}\sum_{n=1}^{N} P(n) \times \exp\left(-\frac{(K(n)-5)^2}{2 \times 1.8^2}\right) + \frac{\lambda}{N}\sum_{n=1}^{N} P(n) \quad (3)$$

In Eq. (3), when the Gaussian weight is assigned according to the user input, λ is set to '1'. On the contrary, when the simple arithmetic average is used, λ is set to '0'. In addition, P(n) represents the input data obtained in a previous stage, where n is the total number of the input data existing within a range of the threshold value. In Eq. (3), 'C' in the first term of the right side is expressed as Eq. (4) below and is a constant for conservation of total energy of the inputted data. K(n) represents the position occupied in the input data of the original nine pixels by an n-th pixel value among N number of the selected input data. For example, if n=2 and the position of the pixel is originally 3, K(2) is equal to 3.

$$C = \sum_{n=1}^{N} \exp\left(-\frac{(K(n)-5)^2}{2 \times 1.8^2}\right) \quad (4)$$

By performing the smoothing on all the input pixels, the noiseless Cb or Cr data, i.e., smoothed Cb or Cr data, can be obtained.

The RGB color space converting unit 40 converts the Cb and Cr data, i.e., smoothed Cb or Cr data, from the adaptive color noise filtering unit 30 and the Y data from the YCbCr color space converting unit 20 into the RGB color space. That is, the RGB color space converting unit 40 converts the YCbCr data into the RGB color. An exemplary converting method using a matrix-vector product is expressed as $$\begin{bmatrix} R \\ G \\ B \end{bmatrix} = \begin{bmatrix} 1.402 & 1 & 0 \\ -0.714 & 1 & -0.344 \\ 0 & 1 & 1.772 \end{bmatrix} \begin{bmatrix} Cr-128 \\ Y \\ Cb-128 \end{bmatrix} \quad (5)$$

FIGS. 7A to 7D are diagrams of resultant images when the apparatus of the present invention is applied.

Figure 7A:
FIG. 7A is a diagram depicting an original color image.
Figure 7B:
FIG. 7B is a diagram depicting a bayer pattern of the original color image of FIG. 7A.
Figure 7C:
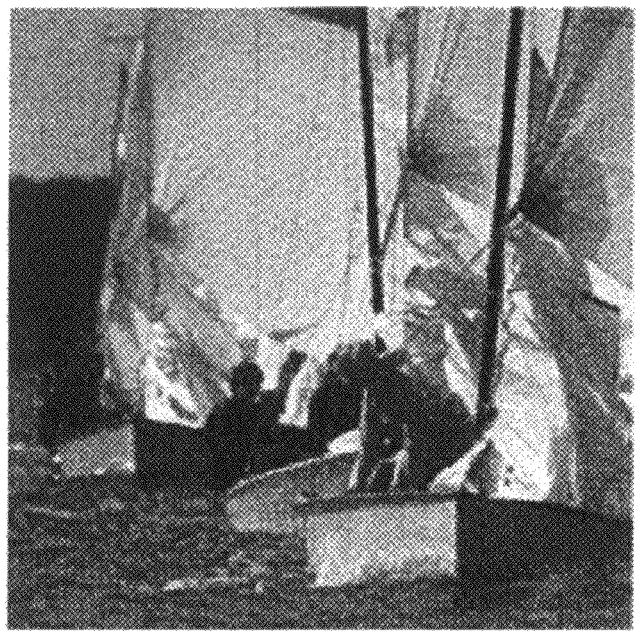
FIG. 7C is a diagram depicting a resultant image given when a de-mosaicking is applied to the bayer pattern of FIG. 7B.
Figure 7D:
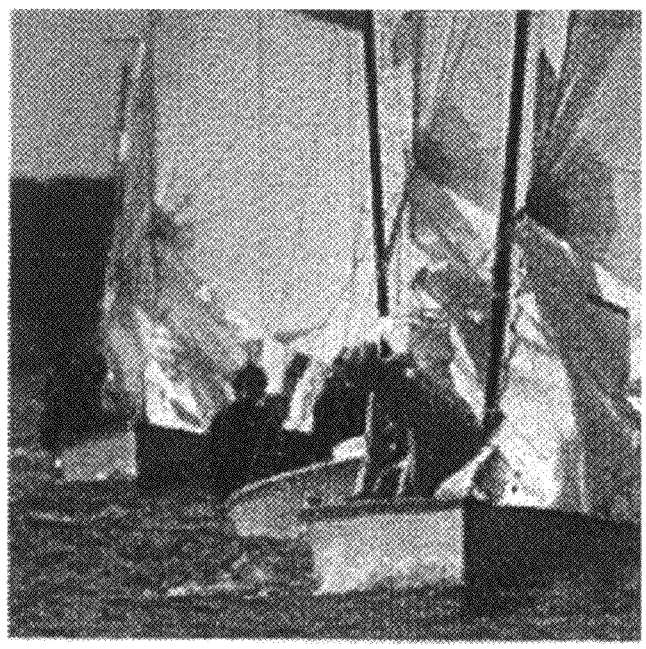
FIG. 7D is a diagram depicting an image given when a color noise is removed from the image of FIG. 7C in accordance with an embodiment of the present invention.

Specifically, FIG. 7A is a diagram of an original color image, FIG. 7B is a diagram of a bayer pattern of the original color image of FIG. 7A, FIG. 7C is a diagram of a resultant image given when a de-mosaicking is applied to the bayer pattern of FIG. 7B, and FIG. 7D is a diagram of an image given when a color noise is removed from the image of FIG. 7C in accordance with an embodiment of the present invention.

As described above, the more improved quality of image can be provided by adaptively smoothing the color noise generated when the de-mosaicking is applied to the bayer pattern.

Also, by smoothing the divided channels, the signal to noise ratio is enhanced and thus the image sensor adopting the bayer pattern can provide good image quality.

In addition, according to the object and application, a video tracking technology can enhance its recognition and tracking accuracy.

Further, a mobile image sensor can provide an improved image, thus meeting user's higher demand.

The present application contains subject matter related to the Korean patent application No. KR 2005-103737, filed in the Korean Patent Office on Nov. 1, 2005, the entire contents of which being incorporated herein by reference.

While the present invention has been described with respect to the particular embodiments, it will be apparent to those skilled in the art that various changes and modifications may be made without departing from the scope of the invention as defined in the following claims.

What is claimed is:

1. An apparatus, comprising:
    a color-space converter configured to receive RGB color data produced from image data of a plurality of adjacent pixels, and to output YCbCr color data for the plurality of adjacent pixels; and
    an adaptive filter configured to:
        receive Cb color data for the plurality of adjacent pixels;
        determine a data range for the plurality of adjacent pixels based on the received Cb color data; and
        filter the Cb color data that falls within the data range,
    wherein the adaptive filter comprises:
        a linear filter configured to smooth selected Cb color data; and
        a data selector configured to select Cb color data for the linear filter that falls within the determined data range.

2. The apparatus of claim 1, wherein the adaptive filter is further configured to:
    receive Cr color data for the plurality of adjacent pixels;
    determine a second data range for the plurality of adjacent pixels based on the received Cr color data; and
    filter Cr color data that falls within the second data range.

3. The apparatus of claim 1, further comprising a de-mosaicking unit configured to:
    receive bayer data for the plurality of adjacent pixels; and
    output the RGB color data for the plurality of adjacent pixels.

4. The apparatus of claim 1, wherein:
    the adaptive filter further comprises an adaptive threshold generator configured to determine a threshold value based on the received Cb color data, and output an upper threshold and lower threshold of the data range;
    the upper threshold corresponds to the threshold value added to the Cb color data for a central pixel from the plurality of adjacent pixels; and
    the lower threshold corresponds to the threshold value subtracted from the Cb color data for the central pixel.

5. The apparatus of claim 1, wherein the adaptive filter is further configured to:
    filter the Cb color data based on Gaussian weights in response to a select signal having a first state; and
    filter the Cb color data based on unit weights in response to the select signal having a second state.

6. A method, comprising:
    converting RGB color data associated with a plurality of adjacent pixels to YCbCr color data;
    determining a data range for the plurality of adjacent pixels based on Cr color data for the plurality of adjacent pixels;
    generating a threshold value based on the Cr color data;
    adding the threshold value to Cr color data for a central pixel from the plurality of adjacent pixels to obtain an upper threshold of the data range;
    subtracting the threshold value from the Cr color data for the central pixel to obtain a lower threshold of the data range; and
    filtering Cr color data for the plurality of adjacent pixels that falls within the data range.

7. The method of claim 6, further comprising:
    determining a second data range for the plurality of adjacent pixels based on the Cb color data for the plurality of adjacent pixels; and
    filtering Cb color data for the plurality of adjacent pixels that falls within the second data range.

8. The method of claim 6, further comprising:
    receiving bayer data for the plurality of adjacent pixels; and
    generating the RGB color data for the plurality of adjacent pixels based on the bayer data.

9. The method of claim 6, wherein said filtering Cr color data comprises:
    selecting Cr color data of the plurality of adjacent pixels that falls between the upper threshold and the lower threshold; and
    filtering the selected Cr color data.

10. The method of claims 6, wherein said filtering Cr color data comprises:
    selecting Cr color data that have a predetermined relationship to the upper threshold and the lower threshold; and
    smoothing only the Cr color data that were selected.

11. The method of claim 6, wherein said filtering Cr color data comprises:
    smoothing the Cr color data based on Gaussian weights in response to a first signal; and
    smoothing the Cr color data based on unit weights in response to a second signal.

12. A method, comprising:
    converting first, second, and third color component data associated with a plurality of adjacent pixels to luma, first chroma, and second chroma component data for the plurality of adjacent pixels;
    determining a data range based on the first chroma component data; and
    filtering the first chroma component data that have a predetermined relationship to the data range;
    wherein said filtering first chroma component data comprises:
        selecting first chroma component data that have a predetermined relationship to the data range; and
        smoothing only the first chroma component data that were selected.

13. The method of claim 12, further comprising:
    determining a second data range based on the second chroma component data; and
    filtering the second chroma component data that have a predetermined relationship to the second data range.

14. The method of claim 13, further comprising:
    receiving bayer data for the plurality of adjacent pixels; and
    generating the first, the second, and the third color component data based on the bayer data.

15. The method of claim 12, wherein:
    the first, the second, and the third color component data respectively correspond to R, G, and B color data.

16. The method of claim 12, wherein:
the luma, the first chroma, and the second chroma component data respectively correspond to Y, Cr, and Cb color data.

17. A method, comprising:
converting first, second, and third color component data associated with a plurality of adjacent pixels to luma, first chroma, and second chroma component data for the plurality of adjacent pixels;
determining a data range based on the first chroma component data; and
filtering the first chroma component data that have a predetermined relationship to the data range;
wherein said filtering first chroma component data comprises:
   smoothing the first chroma component data based on Gaussian weights in response to a first signal; and
   smoothing the first chroma component data based on unit weights in response to a second signal.

18. The method of claim 17, further comprising:
receiving bayer data for the plurality of adjacent pixels; and
generating the first, the second, and the third color component data based on the bayer data.

19. The method of claim 17, wherein:
the first, the second, and the third color component data respectively correspond to R, G, and B color data; and
the luma, the first chroma, and the second chroma component data respectively correspond to Y, Cr, and Cb color data.

20. An image sensor, comprising:
a pixel array arranged in a bayer pattern and configured to output bayer data;
a de-mosaicking unit configured to convert the bayer data to first color-space data comprising first, second, and third color component data;
a color-space converter unit configured to convert the first color-space data to second color-space data comprising luma, first chroma, and second chroma component data; and
an adaptive filter configured to determine a data range for a plurality of adjacent sensor pixels of the pixel array based on the first chroma component data, and to filter the first chroma component data that have a predetermined relationship to the data range;
wherein said adaptive filter is further configured to:
   select first chroma component data that have a predetermined relationship to the data range; and
   smooth only the first chroma component data that were selected.

21. The image sensor of claim 20, wherein the adaptive filter is further configured to:
determine a second data range based on the second chroma component data; and
filter the second chroma component data that have a predetermined relationship to the second data range.

22. The image sensor of claim 20, wherein:
the first, the second, and the third color component data respectively correspond to R, G, and B color data; and
the luma, the first chroma, and the second chroma respectively correspond to Y, Cr, and Cb color data.

23. An image sensor, comprising:
a pixel array arranged in a bayer pattern and configured to output bayer data;
a de-mosaicking unit configured to convert the bayer data to first color-space data comprising first, second, and third color component data;
a color-space converter unit configured to convert the first color-space data to second color-space data comprising luma, first chroma, and second chroma component data; and
an adaptive filter configured to determine a data range for a plurality of adjacent sensor pixels of the pixel array based on the first chroma component data, and to filter the first chroma component data that have a predetermined relationship to the data range;
wherein the adaptive filter is further configured to:
   smooth the first chroma component data based on Gaussian weights in response to a first signal; and
   smooth the first chroma component data based on unit weights in response to a second signal.

24. The image sensor of claim 23, wherein the adaptive filter is further configured to:
determine a second data range based on the second chroma component data; and
filter the second chroma component data that have a predetermined relationship to the second data range.

25. The image sensor of claim 23, wherein:
the first, the second, and the third color component data respectively correspond to R, G, and B color data; and
the luma, the first chroma, and the second chroma respectively correspond to Y, Cr, and Cb color data.

* * * * *

UNITED STATES PATENT AND TRADEMARK OFFICE
CERTIFICATE OF CORRECTION

| | | |
|---|---|---|
| PATENT NO. | : 8,199,216 B2 | Page 1 of 1 |
| APPLICATION NO. | : 12/495129 | |
| DATED | : June 12, 2012 | |
| INVENTOR(S) | : Hwang | |

It is certified that error appears in the above-identified patent and that said Letters Patent is hereby corrected as shown below:

In Column 2, Line 63, delete "patter;" and insert -- pattern; --, therefor.

In Column 10, Line 1, in Claim 20, delete "smooth" and insert -- smoothing --, therefor.

Signed and Sealed this
Twenty-third Day of October, 2012

David J. Kappos
*Director of the United States Patent and Trademark Office*